(12) United States Patent
Wu et al.

(10) Patent No.: US 11,478,715 B1
(45) Date of Patent: Oct. 25, 2022

(54) USER-CONTROLLABLE MODEL-DRIVEN MATCHMAKING

(71) Applicant: Electronic Arts Inc., Redwood City, CA (US)

(72) Inventors: Meng Wu, Fremont, CA (US); Qilian Yu, Redwood City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 194 days.

(21) Appl. No.: 16/908,421

(22) Filed: Jun. 22, 2020

Related U.S. Application Data

(60) Provisional application No. 62/975,367, filed on Feb. 12, 2020.

(51) Int. Cl.
*A63F 13/798* (2014.01)
*A63F 13/795* (2014.01)
(Continued)

(52) U.S. Cl.
CPC .......... *A63F 13/795* (2014.09); *A63F 13/352* (2014.09); *A63F 13/67* (2014.09); *G06N 3/08* (2013.01); *G06N 20/20* (2019.01)

(58) Field of Classification Search
CPC ...... A63F 13/795; A63F 13/352; A63F 13/67; G06N 3/08; G06N 20/20
(Continued)

(56) References Cited

U.S. PATENT DOCUMENTS

| 8,102,253 B1* | 1/2012 | Brady, Jr. ............. G06Q 10/10 340/991 |
| 8,706,739 B1* | 4/2014 | Song ................... G06F 16/9535 707/748 |

(Continued)

OTHER PUBLICATIONS

Hsieh et al., U.S. Appl. No. 17/116,565, provisional of U.S. Appl. No. 17/116,565, also US PG pub 2021/0174164, "System and Method for a Personalized Search and Discovery Engine", Dec. 9, 2019 (Year: 2019).*

(Continued)

*Primary Examiner* — Michael A Cuff
(74) *Attorney, Agent, or Firm* — McDermott Will & Emery LLP

(57) ABSTRACT

Various aspects of the subject technology relate to systems, methods, and machine-readable media for user matchmaking. The method includes training a quality model and an embedding model based on historical data and user control options. The method also includes receiving user control options and matchmaking requests from users. The method also includes embedding, through the embedding model, user data regarding the users into an embedded space based on the received user control options and the matchmaking requests. The method also includes determining, based on the embedded user data, that a distance between two users satisfies a distance threshold. The method also includes matching the two users when the determined distance satisfies the distance threshold.

20 Claims, 9 Drawing Sheets

(51) Int. Cl.
*A63F 13/352* (2014.01)
*A63F 13/67* (2014.01)
*G06N 20/20* (2019.01)
*G06N 3/08* (2006.01)

(58) Field of Classification Search
USPC .......................................................... 463/42
See application file for complete search history.

(56) References Cited

U.S. PATENT DOCUMENTS

| | | | |
|---|---|---|---|
| 10,334,532 B2* | 6/2019 | Chawla .............. | H04W 52/0254 |
| 2011/0093327 A1* | 4/2011 | Fordyce, III ....... | G06Q 30/0224 |
| | | | 705/14.66 |
| 2011/0238476 A1* | 9/2011 | Carr ....................... | G06Q 30/00 |
| | | | 705/14.1 |
| 2014/0122379 A1* | 5/2014 | Moffitt ............... | A61N 1/37247 |
| | | | 706/46 |
| 2014/0274403 A1* | 9/2014 | Anastasopoulos .... | A63F 13/795 |
| | | | 463/42 |
| 2017/0131864 A1* | 5/2017 | Edgar ................. | G06Q 30/0201 |
| 2017/0134329 A1* | 5/2017 | Edgar ..................... | H04L 51/22 |
| 2018/0188701 A1* | 7/2018 | Billings ............. | G05B 13/0265 |
| 2018/0276111 A1* | 9/2018 | Datta .................. | G06F 11/3664 |
| 2018/0367608 A1* | 12/2018 | Miyaki ............... | H04L 67/1061 |
| 2020/0023277 A1* | 1/2020 | Chow .................... | A63F 13/798 |
| 2020/0289943 A1* | 9/2020 | Rico ........................ | A63F 13/35 |
| 2021/0168285 A1* | 6/2021 | Kato ...................... | H04N 5/247 |
| 2021/0174164 A1* | 6/2021 | Hsieh .................. | G06N 3/0427 |

OTHER PUBLICATIONS

Wu et al., U.S. Appl. No. 16/908,421, provisional of U.S. Appl. No. 16/908,421, "User-controllable model-driven matchmaking", Feb. 12, 2020 (Year: 2020).*

Hsieh et al., "Collaborative Metric Learning", WWW'17: Proceedings of the 26th International Conference on World Wide Web • Apr. 2017 • pp. 193-201 • https://doi.org/10.1145/3038912.3052639 (Year: 2017).*

Wang et al., "Neural Graph Collaborative Filtering", SIGIR'19: Proceedings of the 42nd International ACM SIGIR Conference on Research and Development in Information Retrieval • Jul. 2019 • pp. 165-174 • https://doi.org/10.1145/3331184.3331267 (Year: 2019).*

Campo et al., "Collaborative Metric Learning Recommendation System: Application to Theatrical Movie Releases", Cornell University, arxiv.org/abs/1803.00202, Mar. 1, 2018. (Year: 2018).*

* cited by examiner

USER-CONTROLLABLE MODEL-DRIVEN MATCHMAKING

CROSS REFERENCE TO RELATED APPLICATIONS

This present application claims the benefit of priority under 35 U.S.C. § 119(e) to U.S. Provisional Application No. 62/975,367, filed Feb. 12, 2020, the disclosure of which is hereby incorporated by reference in its entirety for all purposes.

TECHNICAL FIELD

The present disclosure generally relates to video games, and more particularly to user-controllable model-driven online matchmaking.

BACKGROUND

Video games, such as sports video games, first person shooter games, or other online games, often include a multiplayer mode allowing multiple players to connect online to interact with one another in the video game. Players may select a game mode they would like to play, and the video game may find other players looking to play the same game mode. The game will attempt to match players accordingly. However, the matches are not always ideal based on user preferences.

BRIEF SUMMARY

The subject disclosure provides for systems and methods for user-controllable model-driven online matchmaking. In an aspect, a predictive model is trained to estimate potential matchmaking quality under all controllable scenarios utilizing historical data. A locality embedding model may be trained to project matchmaking requests into an embedded space. Users may then be embedded to a lower dimension space and matched together based on the closest Euclidean distance. Both the trained predictive and locality embedding models may then be utilized together to perform user matchmaking.

According to one embodiment of the present disclosure, a computer-implemented method for user matchmaking is provided. The method includes training a quality model and an embedding model based on historical data. The method also includes receiving user control options and matchmaking requests from users. The method also includes embedding, through the embedding model, user data regarding the users into an embedded space based on the received user control options and the matchmaking requests. The method also includes determining, based on the embedded user data, that a distance between two users satisfies a distance threshold. The method also includes matching the two users when the determined distance satisfies the distance threshold.

According to one embodiment of the present disclosure, a system is provided including a processor and a memory comprising instructions stored thereon, which, when executed by the processor, causes the processor to perform a method for user matchmaking. The method includes training a quality model and an embedding model based on historical data. The method also includes receiving user control options and matchmaking requests from users. The method also includes embedding, through the embedding model, user data regarding the users into an embedded space based on the received user control options and the matchmaking requests. The method also includes determining, based on the embedded user data, that a distance between two users satisfies a distance threshold. The method also includes matching the two users when the determined distance satisfies the distance threshold.

According to one embodiment of the present disclosure, a non-transitory computer-readable storage medium is provided including instructions (e.g., stored sequences of instructions) that, when executed by a processor, cause the processor to perform a method for user matchmaking. The method includes training a quality model and an embedding model based on historical data. The method also includes receiving user control options and matchmaking requests from users. The method also includes embedding, through the embedding model, user data regarding the users into an embedded space based on the received user control options and the matchmaking requests. The method also includes determining, based on the embedded user data, that a distance between two users satisfies a distance threshold. The method also includes matching the two users when the determined distance satisfies the distance threshold.

According to one embodiment of the present disclosure, a system is provided that includes means for storing instructions, and means for executing the stored instructions that, when executed by the means, cause the means to perform a method for user matchmaking. The method includes training a quality model and an embedding model based on historical data. The method also includes receiving user control options and matchmaking requests from users. The method also includes embedding, through the embedding model, user data regarding the users into an embedded space based on the received user control options and the matchmaking requests. The method also includes determining, based on the embedded user data, that a distance between two users satisfies a distance threshold. The method also includes matching the two users when the determined distance satisfies the distance threshold.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
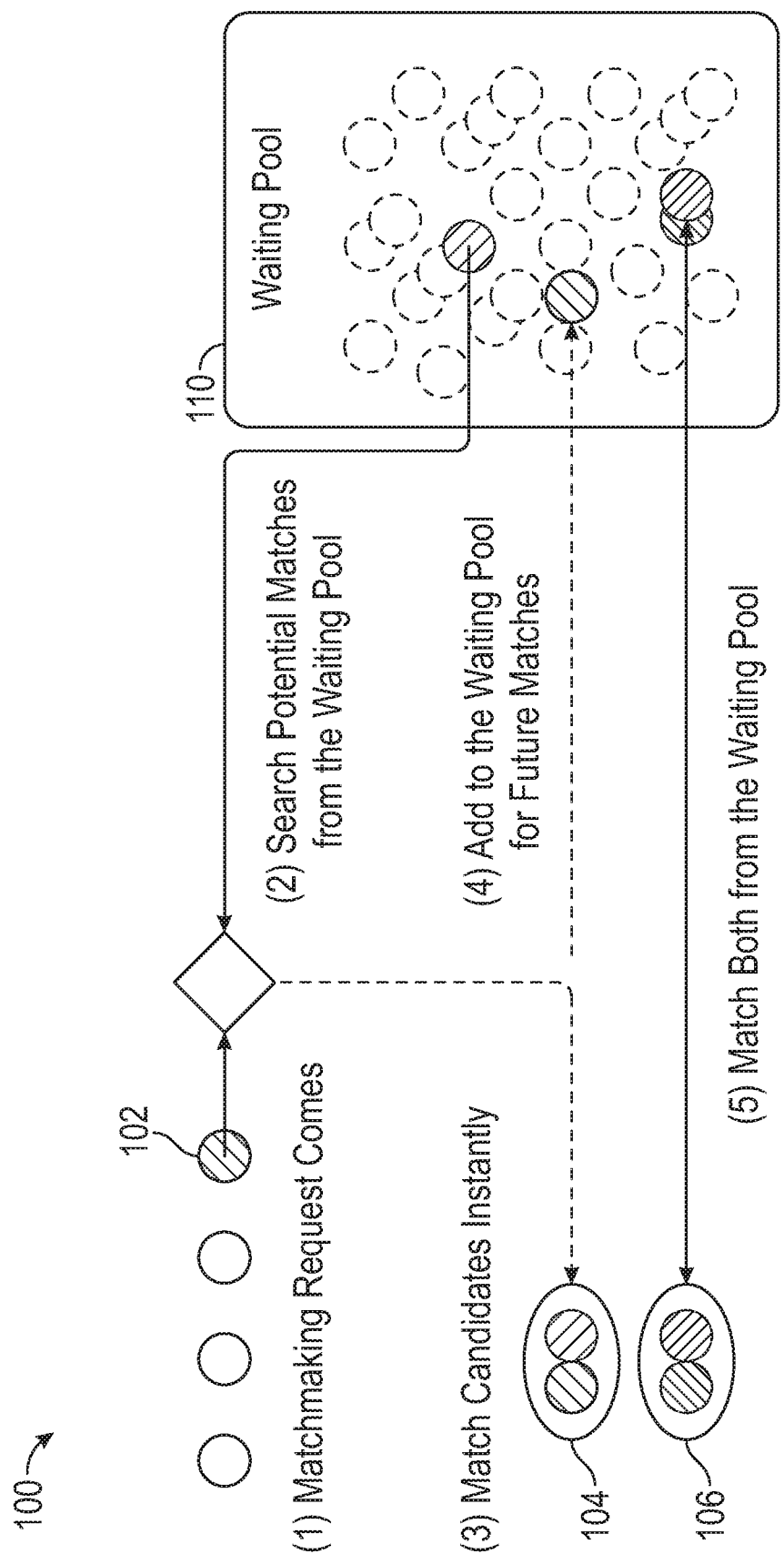
FIG. 1 illustrates an exemplary system for user matchmaking, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Matching is a critical challenge in social networks, job marketing websites, shared-ride services, recommendation systems, and video games. High quality, efficiently implemented matches are imperative for ensuring a good user experience, perceived latency of the service, and cost-effective allocation of service resources. As matching applications rapidly grow, the number of candidates to be matched grows dramatically, increasing both the available candidate data and the dimensions of preference. This growth in size complicates maintaining high quality. Furthermore, finding a good match with reasonably short waiting times for each candidate within online applications introduces a new degree of complexity. All of these factors make the matching problem very challenging.

Many matching systems in production use a rule-based process to determine the quality of each match and then find matches with high qualities. When the number of candidates and the dimension of the data increase, a rule-based matching process becomes convoluted and impractical. Furthermore, defining a quality function to assess the quality of a given match can become very complicated in this situation. Researchers have used machine learning techniques to tackle the problem as a supervised learning problem and construct intricate match quality prediction models to consider various factors. However, given the outputs of non-trivial match quality function from machine learning, it could be even more challenging to construct a rule-based matching policy to optimize the outputs.

Video games, such as sports video games, first person shooter games, or other online games, often include a multiplayer mode allowing multiple players to connect online to interact with one another in the video game. Players may select a game mode they would like to play, and the video game may find other players looking to play the same game mode. The game will attempt to match players accordingly. However, the matches are not always ideal based on user preferences.

Conventionally, real-time matchmaking optimization is challenging for several reasons. For example, online user matchmaking typically involves high dimensional and complex condition satisfaction. The quality desired of matches are also often non-trivial (e.g., based on skill, country, etc.). There is also a dynamic pool of users to match and a speed requirement because users prefer quick matches. This all results in a very large-scale combinatorial problem. Additionally, users typically desire control of preferences to be able to further customize the matchmaking. For example, users may select a game mode to play (e.g., casual or competitive), and a preferred role (e.g., teammates, characters, etc.). Privacy is also a concern of users, so user data is limited for privacy and security reasons and unavailable to be utilized for matchmaking purposes.

Aspects of the present disclosure address these issues by providing for systems and methods for user-controllable model-driven online matchmaking. In an aspect, a predictive model is trained to estimate potential matchmaking quality under all controllable scenarios utilizing historical data. A locality embedding model may be trained to project matchmaking requests into an embedded space. Users may then be embedded to a lower dimension space and matched together based on the closest Euclidean distance. Both the trained predictive and locality embedding models may then be utilized together to perform user matchmaking.

The disclosed system addresses a problem in traditional video game player matchmaking tied to computer technology, namely, the technical problem of matching players online. The disclosed system solves this technical problem by providing a solution also rooted in computer technology, namely, by providing for user-controllable model-driven online matchmaking. The disclosed system also improves the functioning of the computer itself because it allows for efficiently generated fast matches of high quality based on user preferences.

In a 1-1 online matching scenario, when each user arrives, a matching request is initiated. The system searches for the possible and proper candidates. When a pair of users are matched, they are both removed from the system. In many applications, the matching requests arrive in sequence, and the system often manages a dynamic pool of candidates for future requests.

FIG. 1 illustrates an exemplary system 100 for 1-1 user matchmaking, according to certain aspects of the present disclosure. The system 100 may include matchmaking requests 102 from multiple users to be matched with users in a waiting pool 110. For example, the users in the waiting pool 110 may include users that have submitted a matchmaking request. As illustrated, candidates may be matched instantly 104. If matches are not instant, the users may be added to the waiting pool until a match 106 is found. For example, the match 106 may be of users that were waiting in the waiting pool 110.

According to aspects, the system 100 may receive a request 102 from a new user to find a match. The system 100 may then search candidates in the existing waiting pool 110 and find potential matches 104, 106. If the match is meets a distance threshold (e.g., a match threshold) the matched users are removed from the waiting pool 110 and returned as a matched pair 104, 106. If the match does not meet the distance threshold, then the request 102 from the new user is added to the waiting pool 110 for future matches. The waiting pool 110 may also be frequently scanned to match users based on relaxed criteria (e.g., a relaxed distance threshold) so that the users do not wait too long (e.g., over a minute).

Although the process in FIG. 1 may appear straightforward, there are two main hidden challenges. The first challenge is how to search for a potentially good match from the waiting pool, especially when the match quality definition is complicated. A brute force method would visit every candidate pair in the waiting pool. However, it is neither practical nor scalable for online matching systems. Another solution is to build a search index system. Nevertheless, it still encounters challenges such as a high number of features, non-linearity in the search criteria, and the highly dynamic index insertions and deletions. The second challenge is to determine whether the system is supposed to match two candidates together immediately or keep both of them waiting for a better future match. Such a decision process needs a trade-off between a long waiting time with good future opportunities against fast matching with current openings. Note that solving the first challenge is the prerequisite of approaching the second challenge. To overcome these two challenges, a novel method is proposed to leverage recent advances in artificial neural networks to facilitate the online matching problem.

As will be described in more detail below, this method is comprised of 1) a neural network training process that learns an embedding for the quick nearest neighbor search in low dimensional space, and 2) a statistical matching process that determines whether to match with or wait for the best existing candidate. For example, the novel method may be applied to the 1-1 matching problem in an online video game. Because the novel method optimizes the matching strategy for any given match quality models, it can be extended to any 1-1 matching system in different applications, in addition to video game matchmaking.

Figure 2:
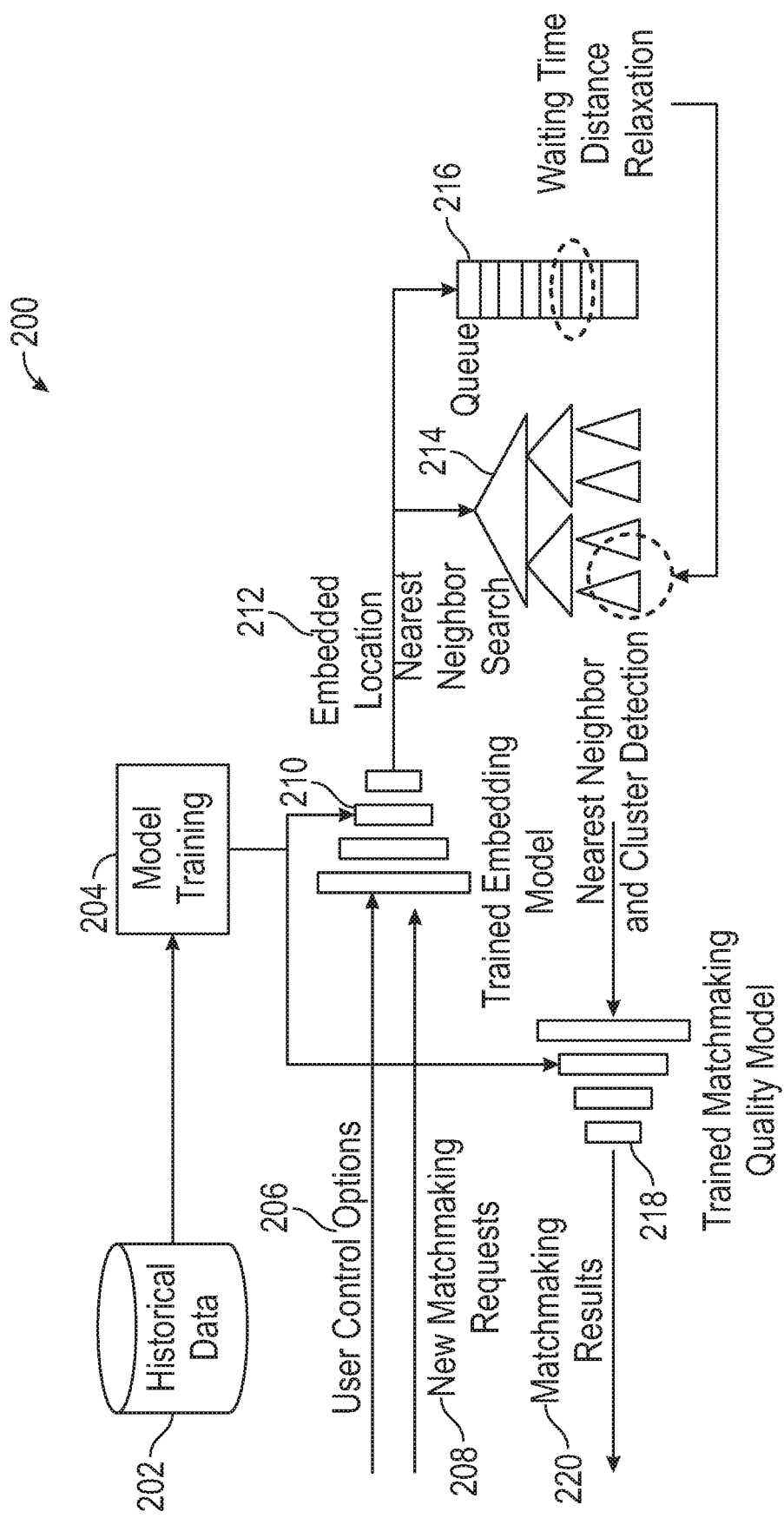
FIG. 2 illustrates an exemplary matchmaking system, according to certain aspects of the present disclosure.

FIG. 2 illustrates an exemplary matchmaking system 200, according to certain aspects of the present disclosure. The system 200 may include historical data 202 that is utilized for model training 204. For example, the historical data 202 may include past user matches and user preferences used for those matches. The historical data 202 may be utilized to train an embedding model 210 and a matchmaking quality model 218. For example, the embedding model 210 may be trained to embed users into embedded locations in an embedded space based on historical user data (e.g., from the historical data 202). The matchmaking quality model 218 may train the embedding model 210.

Once trained, the embedding model 210 may receive user control options 206 and new matchmaking requests 208. For example, the user control options 206 may include a variety of user preferences, including, but not limited to, game modes, game roles, geography, ranking, skill, etc. The new matchmaking requests 208 may be requests from users that are not included in the historical data 202. It is understood that as the new matchmaking requests 208 are received, the requests 208 are also saved in the historical data 202 to improve robustness of the historical data 202.

According to aspects, the trained embedding model 210 may embed the users into embedded locations 212 based on the received user control options 206 and new matchmaking requests 208. As a result, each user becomes represented as an embedded location (e.g., a point) in an embedded space (e.g., a three-dimensional space). Based on the embedded locations 212, a nearest neighbor search may be performed based on a decision tree 214. For example, the decision tree 214 may be configured to locate users closest to each other in the embedded space by continuously halving the embedded space until ideally only two users remain. These two users may then be matched together via a nearest neighbor search and cluster detection. The trained matchmaking quality model 218 may be utilized to train the embedding model 210. The matchmaking results 220 may then be output.

According to aspects, a queue 216 may keep track of how long users have been waiting. For example, the longer a user has been waiting, the more relaxed the nearest neighbor search may be. This seeks to prevent users from waiting too long (e.g., over a minute).

Figure 3:
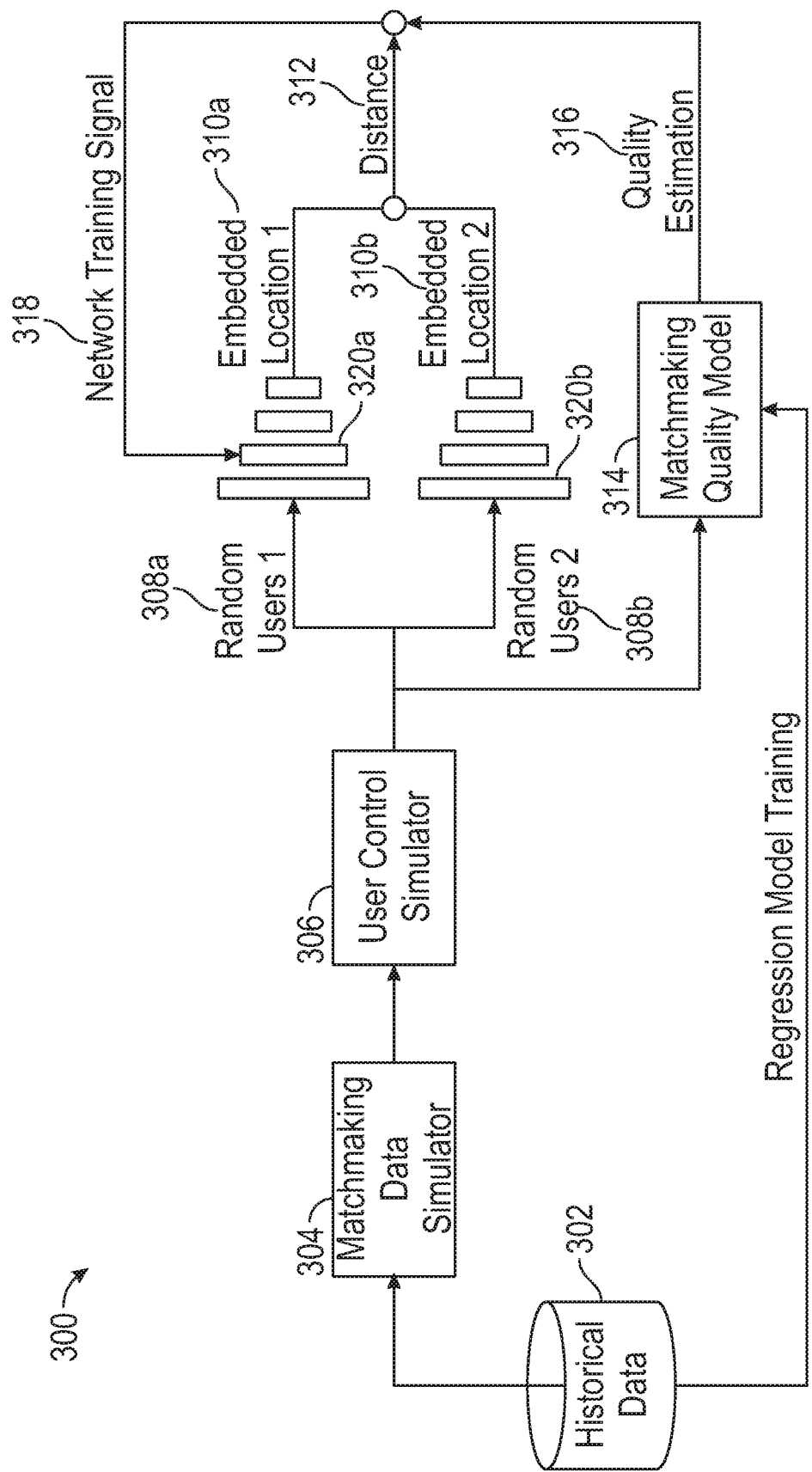
FIG. 3 illustrates an exemplary model training system, according to certain aspects of the present disclosure.

FIG. 3 illustrates an exemplary model training system 300, according to certain aspects of the present disclosure. For example, the model training system 300 may be configured to train the embedding model 210 and the matchmaking quality model 218 of FIG. 2.

According to aspects, the model training system 300 may include historical data 302, a matchmaking data simulator 304, a user control simulator 306, random users 308, neural networks 320, and a matchmaking quality model 314. For example, the matchmaking data simulator 304 and the user control simulator 306 may simulate user data and user preferences based on the historical data 302 to generate pairs of random users (e.g., first random users 308a, second random users 308b) for matching. The neural networks (e.g., a first neural network 320a, a second neural network 320b) may embed the random users 308a, 308b into respective embedded locations 310a, 310b based on the simulated user data and user preferences. A distance 312 between the embedded locations 310a, 310b may be calculated.

According to aspects, the matchmaking quality model 314 may simultaneously receive the simulated user data and user preferences to calculate a quality estimation 316 based on regression model training from the historical data 302. The quality estimation 316 may be compared with the distance 312 to determine whether the match satisfies a match threshold. A network training signal 318 may then be generated based on whether the match satisfied the match threshold and utilized to further train the neural networks 320.

Figure 4A:
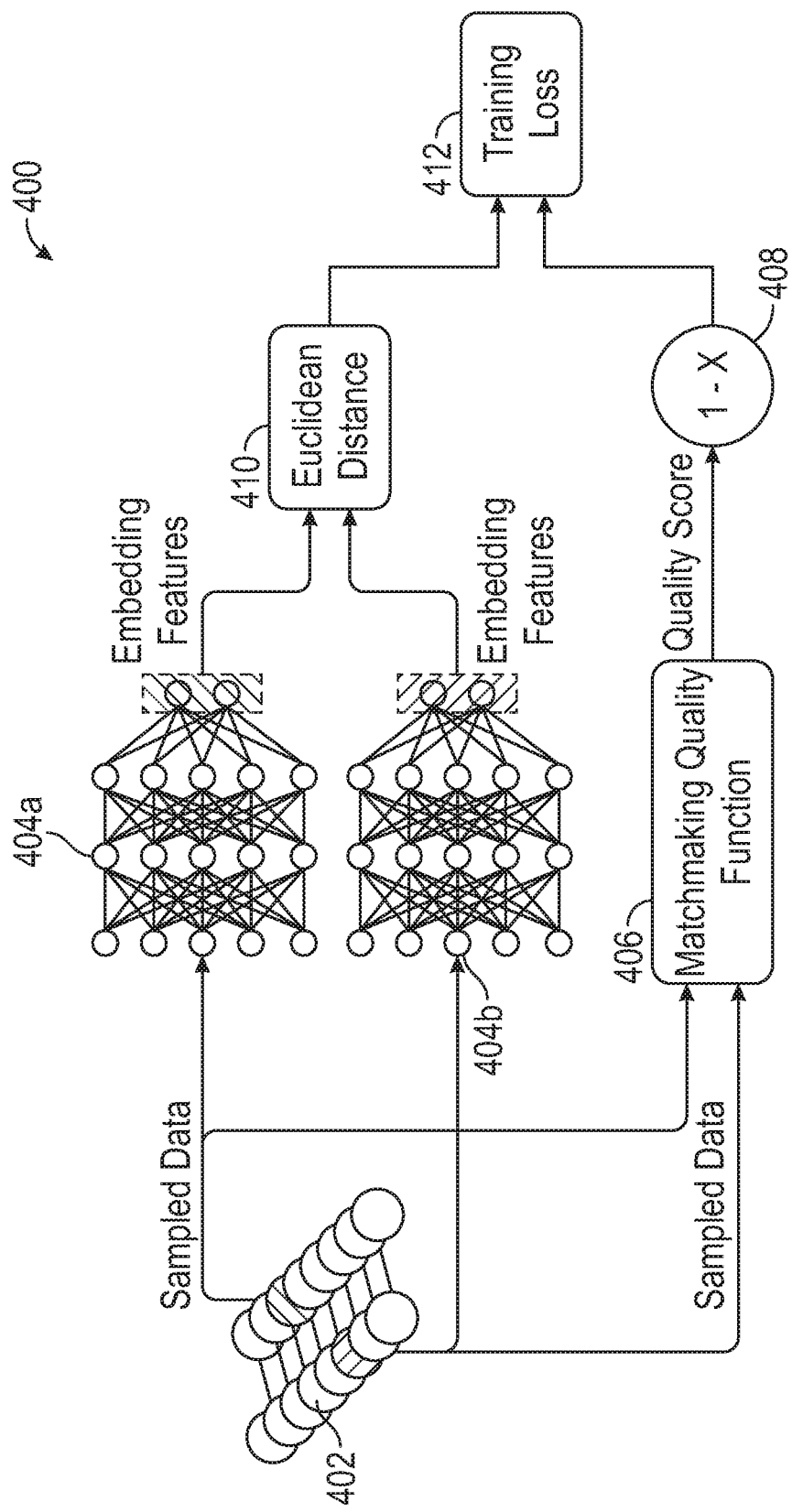
FIGS. 4A and 4B illustrate additional exemplary model training systems, according to certain aspects of the present disclosure.
Figure 4B:
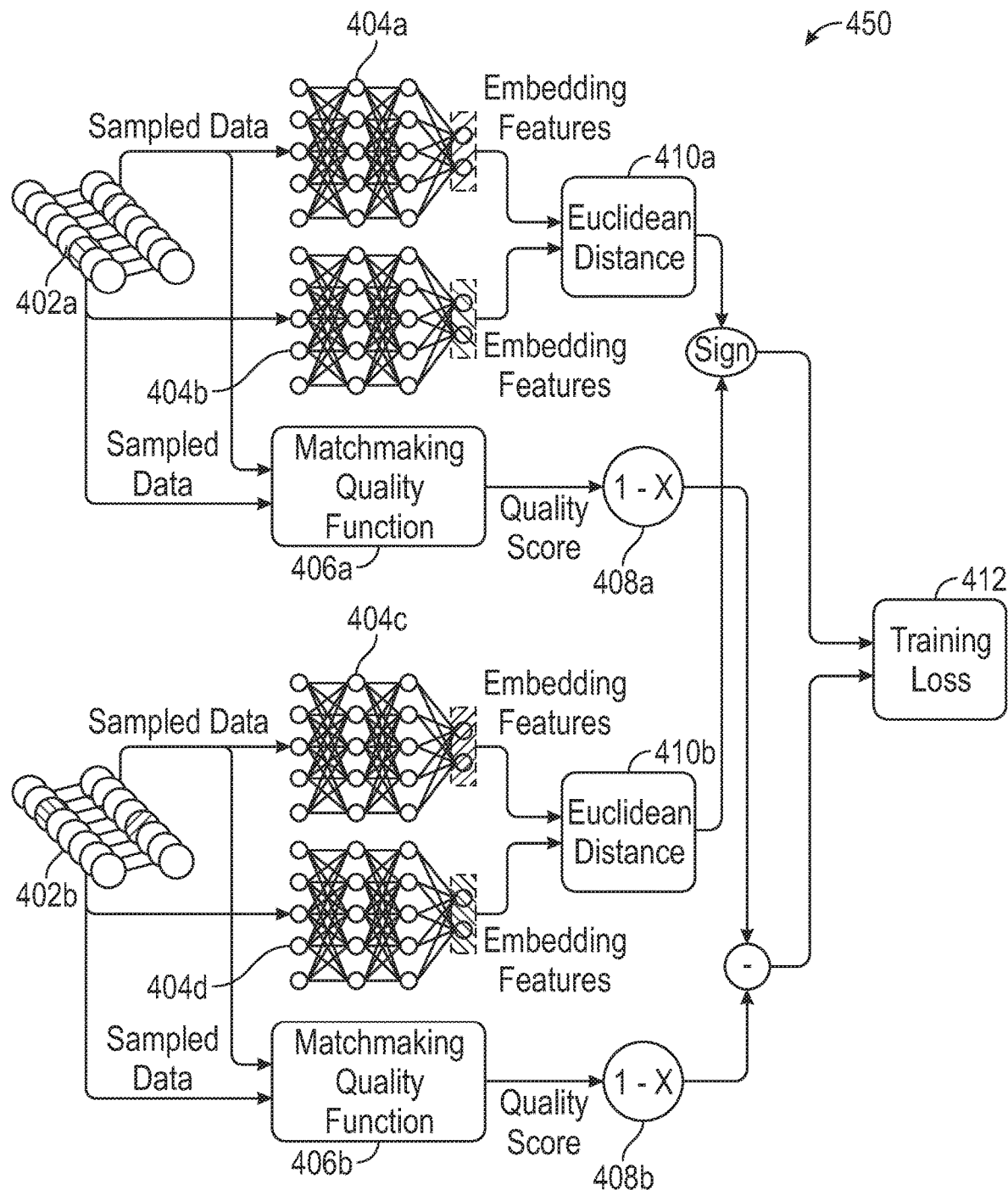

FIGS. 4A and 4B illustrate additional exemplary model training systems 400, 450, according to certain aspects of the present disclosure. Referring to FIG. 4A, a model training system 400 may include training samples 402, neural networks 404a, 404b, and a matchmaking quality function 406.

According to aspects, for each training sample 402, two candidates may be randomly selected from a historical dataset (e.g., historical data 202, 302 of FIGS. 1 and 2). For example, both the states of the candidates and preference vectors of the candidates may be embedded by a multi-layer perceptron neural network (e.g., neural networks 404) to a low-dimensional space.

In an implementation high-quality matches may correlate with small Euclidean distances 410. Therefore, compatibility of the candidate pairs may then be evaluated by a predefined match quality function 406, where the training loss 412 measures the discrepancy between the Euclidean distance 410 of the two embedded positions and one minus the match quality score 408. In mathematical form, this may be represented as:

$$\|f(x_i,w)-f(x_j,w)\|_2 \approx 1-q(x_i,x_j), \quad (1)$$

where f: $R^{u \times 1} \mapsto R^{v \times 1}$ denotes the embedding network mapping dimension u to v where v<<u. In the training process, the L2 distance may be minimized between the left and right-hand sides of Eqn. (1), where the training loss function is:

$$L^{dist-embd}(w) = \sum_{i,j}(\|f(x_i,w)-f(x_j,w)\|_2 - (1-q(x_i,x_j)))^2 \quad (2)$$

The loss function includes a square root operation that is not numerically stable for obtaining the gradient. Thus, the loss function $L$_dist-embd (w) may be modified as:

$$\sum_{i,j} \frac{(\|f(x_i,w)-f(x_j,w)\|_2^2 - (1-q(x_i,x_j)^2))^2}{|1-q(x_i,x_j)|+\delta} \quad (3)$$

where δ is a small positive constant preventing division by zero.

Because the loss function only considers the relative difference between two outputs of the embedding network f, it is shift-invariant to the outputs. In other words, adding a constant value to the embedding network output does not affect the loss 412. The match quality function 406 may thus be defined with an output range from zero to one, and a similar bounding box may be applied to the output of the embedding network 400 to increase numerical stability. Additionally, the tan h function may be utilized as the activation function of the last layer of multi-layer perception.

Referring to FIG. 4B, a model training system 450 may include training samples 402a, 402b, neural networks 404a, 404b, 404c, 404d, and a matchmaking quality functions 406a, 406b. Similar to the above in FIG. 4A, the Euclidean distances 410a, 410b, may be compared with quality scores 408a, 408b to determine a training loss 412.

According to aspects, the distance being exactly equal to 1−q (e.g., the match quality value 408) is not necessary. Because the best possible match candidates are discovered by the nearest neighbor search in the embedded space, the required condition is merely for the shorter distance to represent a better match (a higher value of q). This type of embedding may be referred to as an order embedding, where the loss function is computed as follows:

$$L^{order-embd}(w) = \sum_{i,j,i',j'} (q(x_i, x_j) - q(x_{i'}, x_{j'})) \times \quad (4)$$

$$\text{Sign}(\|f(x_i, w) - f(x_j, w)\|_2^2 - \|f(x_{i'}, w) - f(x_{j'}, w)\|_2^2)$$

The pairs (i, j) and (i', j') may be two arbitrary candidate pairs. The difference between the match qualities $(x_i, x_j)$ and $(x_{i'}, x_{j'})$ serves as the weights of the order so that if the match quality difference between two pairs is large, it is more likely to generate a correct order of the distances. Therefore, the loss function is minimized if a positive difference between the match qualities is connected with a negative difference between the distances and vice versa. The modified final loss function to make the loss function more friendly to the gradient descent process is:

$$L^{order-embd-m}(w) = \sum_{i,j,i',j'} (q(x_i, x_j) - q(x_{i'}, x_{j'})) \times \quad (5)$$

$$\left( \text{SoftSign}(\|f(x_i, w) - f(x_j, w)\|_2^2 - \|f(x_{i'}, w) - f(x_{j'}, w)\|_2^2) + \eta \sum_{i,j} \|f(x_i, w) - f(x_j, w)\|_2^2 \right)$$

where the SoftSign function is defined as:

$$\text{SoftSign}(x) = \frac{x}{1 + |x|} \quad (6)$$

The last regularization term in Eqn. (5) is to ensure the numeric stability, and the hyper-parameter 17 determines how much the embedding positions should be close to each other.

According to aspects, data may be randomly generated with similar distribution to historical data, but with a wide probability span of input data. To preserve some of the inter-feature relationships, a Chow-Liu tree may be constructed between the features to extract the greatest mutual information while having a simple graph representation. For example, the data generation may include a traversal of the Chow-Liu tree with a Markov process. The generated data may then be combined with the real data (e.g., historical data) to be utilized in the training process.

According to aspects, it may be assumed that all candidates have the same distribution of good and bad matches among the total population. As a result, a Poisson random process may be utilized to model online request arrival scenarios. Therefore, the probability of having k matches with the quality less than c within waiting time t may be expressed as:

$$Pr\left(\sum_{i'} 1\{x_{i'} \mid q(x_i, x_{i'}) \le c, t_{i'} \le t_i + t\} = k\right) = e^{-\lambda} \frac{\lambda^k}{k!}, \quad (7)$$

where λ is the arrival rate with inputs c and t', which is computed as:

$$\lambda(c, t) = t \cdot \frac{\sum_{i'} j1\{x_{i'} \mid q(x_i, x_{i'}) \le c\}}{\sum_{i'} i'1\{x_{i'}\}} \cdot \frac{\sum_{i'} 1\{x_{i'} \mid 0 < t_{i'} \le T\}}{T} \quad (8)$$

The second term of the right-hand side in Eqn. (8) is the cumulative density function of the population measured by q, and the third term is the overall matching request rate. Note that both of them are easily measurable from the data. For simplicity, those two parts may be combined as a single function (c). Therefore, the cumulative density function with waiting time over t' for the next candidate with match quality less than c is:

$$F_{CT}(c,t) = Pr(q(x_i, x_{i'}) \le c, x_{i'} + t)$$

$$= 1 - e^{-\lambda(c,t)}$$

$$= 1 - e^{-t \cdot g(c)} \forall \ c \in (0,1], t \in (0, \infty) \quad (9)$$

The expected waiting reward for the candidate i is:

$$r^{wait}_{x_i} = E_{F_{CT}}[c \cdot p(t)] \quad (10)$$

Similarly, the expected waiting reward for the most beneficial matched candidate j from the pool so far is:

$$r^{wait}_{x_j} = E_{F_{CT}}[c \cdot p(t+(t_i-t_j))] \quad (11)$$

According to aspects, the static 1-1 matching problem may be formulated as a combinatorial optimization that simplifies to:

$$ob_i(m, t) = \sum_{i,j} \{p(t_{i,j} - t_i) + p(t_{i,j_*} - t_{j_*})\} \cdot q(x_i, x_j) m_{i,j} \quad (12)$$

where $p(t) \in (0, 1]$ is a monotonically decreasing waiting time penalty function, and q: $R^{2w \times 1} \mapsto \rightarrow (0, 1]$ is the match quality function that takes only state and preference vector of candidates into account.

Based on Eqn. (12), the immediately matched candidates i and j have the reward:

$$r^{match}_{x_i, x_j} = (1 + p(t_j - t_i)) q(x_i, x_j) \quad (13)$$

Gathering all expectations together, whether to match two candidates instantly or to keep them waiting in the pool can be determined by comparison of the expected rewards as:

$$r^{match}_{x_p x_j} > r^{wait}_{x_i} + r^{wait}_{x_j} \quad (14)$$

The expected waiting reward can be further reduced if the waiting time penalty function has a closed-form. For example, the linear waiting time penalty function may be defined as:

$$p(t) = 1 - \frac{t}{T_{max}} \forall\, t \in [0, T_{max}] \quad (15)$$

where $T_{max}$ is the parameter that controls the decay speed, also known as the maximum waiting time. Then, the expected reward of waiting becomes a function that only depends on the request distribution and waiting time as follows:

$$r\frac{wait}{u_i} \approx \int_0^1 c \cdot \frac{dg(c)}{dc} \cdot \left(\frac{1}{2g(c)} - \frac{1}{6T_{max}g^2(c)}\right) dc \quad (16)$$

$$r\frac{wait}{u_i} \approx \int_0^1 c \cdot \frac{dg(c)}{dc} \cdot \left(\frac{1 - \frac{t_i - t_j}{T_{max}}}{2g(c)} - \frac{1}{6T_{max}g^2(c)}\right) dc$$

It may be assumed that the function (c) is differentiable, otherwise, a discrete version can be derived. Note that $r^{wait}_{x_j} \leq p(t+(t_i-t_j))r^{wait}_{x_i}$ means the expected reward of waiting decreases faster than the expected reward of matching. Thus, two candidates who were previously decided not to be matched can become a match in Eqn. (11) after both of them wait for a certain amount of time, which is the desired behavior.

Figure 5:
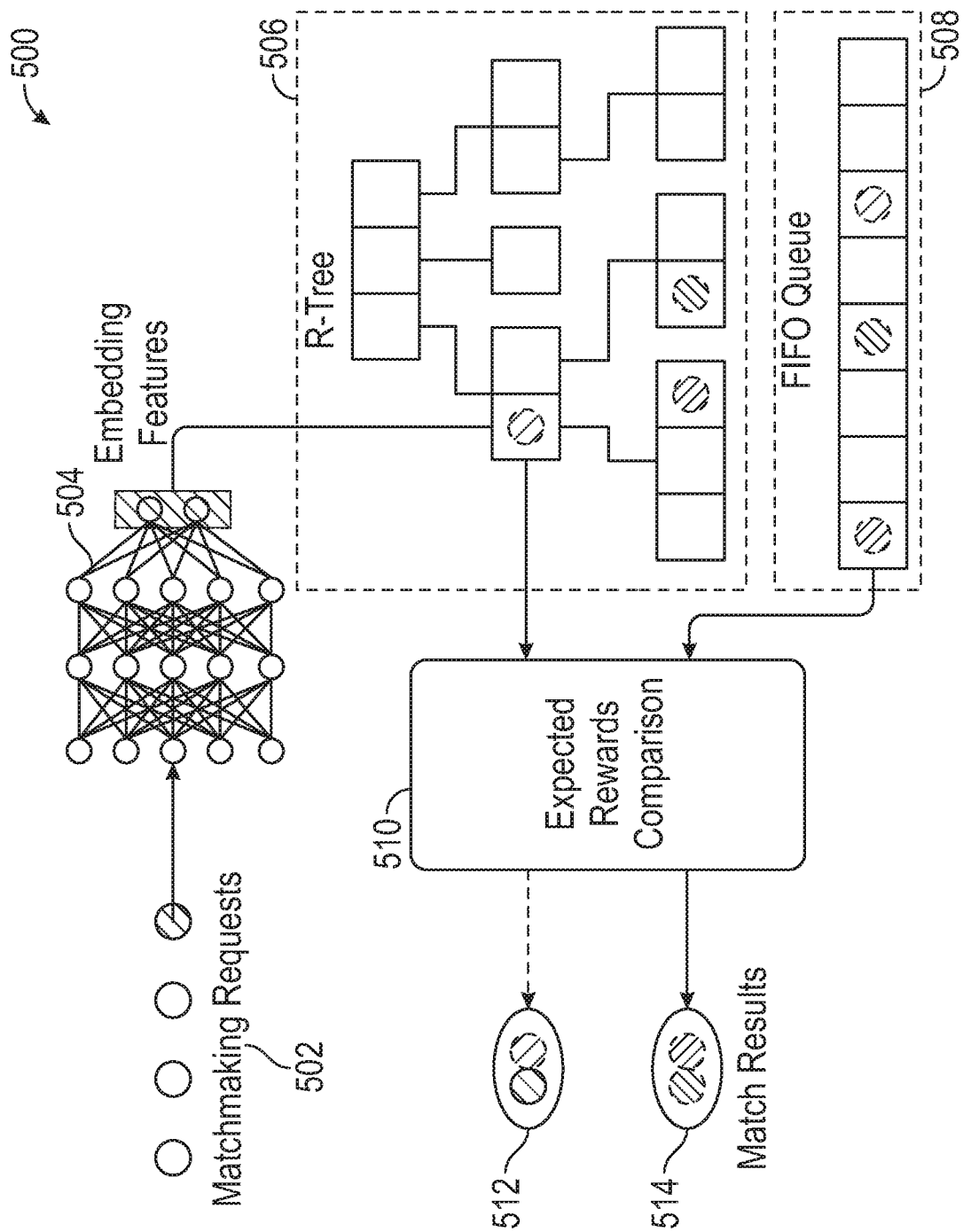
FIG. 5 illustrates an exemplary system for user matchmaking, in accordance with one or more implementations.

FIG. 5 illustrates an exemplary system 500 for user matchmaking, in accordance with one or more implementations. For example the system 500 may include matchmaking requests 502, a trained neural network 504, a decision tree 506, a queue 508 (e.g., a first in, first out (FIFO) queue), an expected rewards comparison 510, and matches 512, 514. According to aspects, the system 500 may conduct matchmaking as described above in relation to Eqns. (7) through (16).

According to aspects, the system 500 may match users according to an algorithm based on a greedy strategy. For example, the algorithm may be defined as follows:

Initialize v-dimension R-tree
Initialize FIFO Queue
For all user request i=1, 2, 3, . . . do
  Use train embedding network $y_i \leftarrow f(x_i)$
  if Find nearest neighbor j in R-tree with $y_i$ then
    Compute matching quality $q(x_i, x_j)$
    Compute expected rewards for waiting in Eqn. (10) and (11)
    if Eqn. (14) is true then
      Return matched pair $x_i$ and $x_j$
    else
      Add i to Queue and $y_i$ to the R-tree
    end
  else
    Add i to Queue and $y_i$ to the R-tree
  end
For all First l candidates i' in Queue do
  Find the best match j'
  if Waiting time is over maximum then
    Return matched pair $x_{i'}$ and $x_{j'}$
  end
  Compute match quality $q(x_i, x_j)$
  Compute expected rewards in Eqn. (11)
  if Eqn. (14) is true then
    Return matched pair $x_{i'}$ and $x_{j'}$
  end
end
end Specifically, the first half of the algorithm conducts neural network based location embedding and searches for the nearest neighbors with the help of an R-tree (e.g., the decision tree 506). To manage the waiting pool, a FIFO queue 508 is used to prioritize some candidates 502 that have been waiting and not revisited by the algorithm for the longest time. In each iteration, the first l candidates in the waiting pool are retried to match with others in the pool. Empirically, a small number such as 3 for l is sufficient for most cases. If the system has a higher computing capacity, the value of l can be increased.

Figure 6:
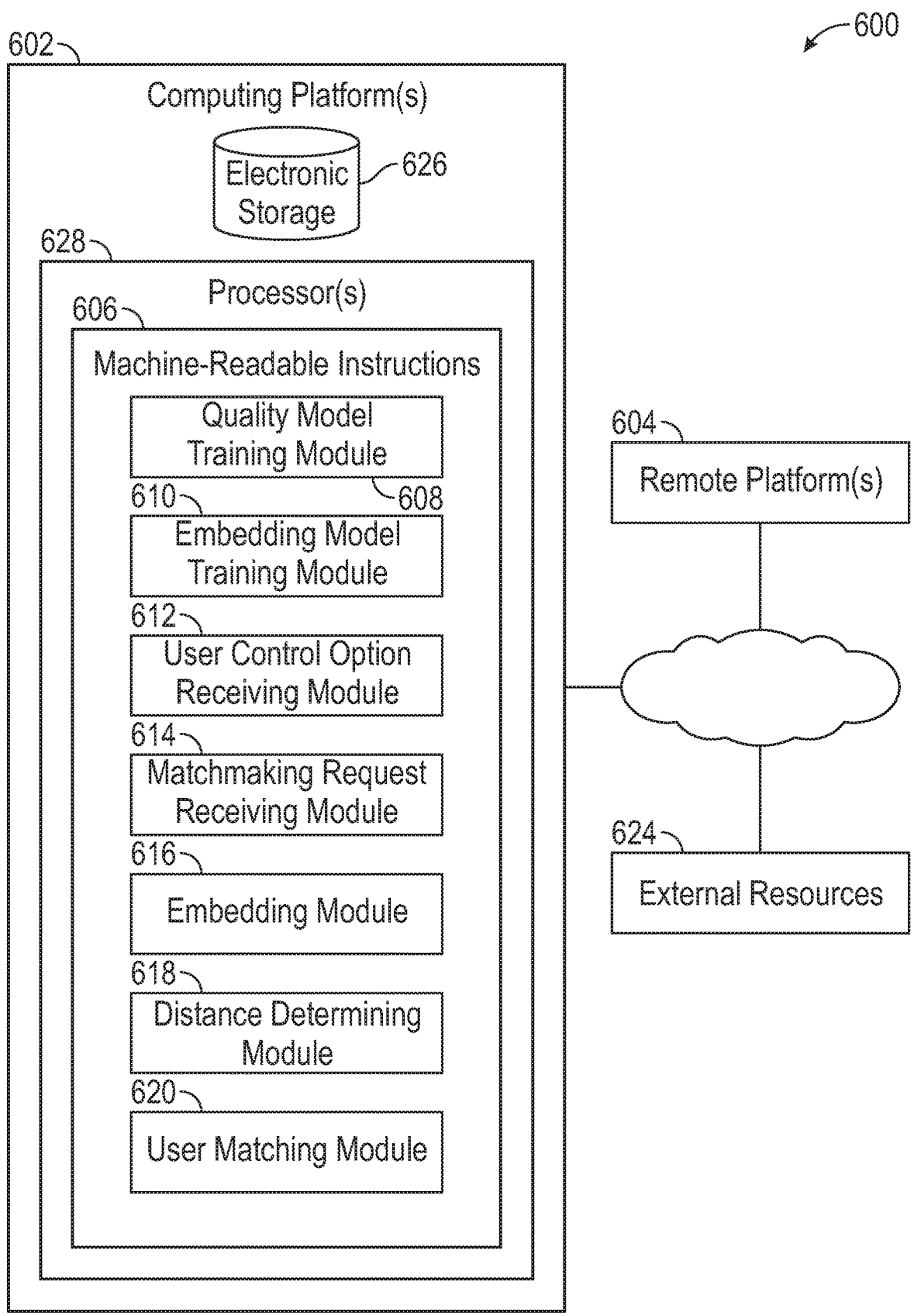
FIG. 6 illustrates an exemplary architecture for user matchmaking, in accordance with one or more implementations.

FIG. 6 illustrates an exemplary system 600 for user matchmaking, in accordance with one or more implementations. In some implementations, system 600 may include one or more computing platforms 602. Computing platform(s) 602 may be configured to communicate with one or more remote platforms 604 according to a client/server architecture, a peer-to-peer architecture, and/or other architectures. Remote platform(s) 604 may be configured to communicate with other remote platforms via computing platform(s) 602 and/or according to a client/server architecture, a peer-to-peer architecture, and/or other architectures. Users may access system 600 via remote platform(s) 604.

Computing platform(s) 602 may be configured by machine-readable instructions 606. Machine-readable instructions 606 may include one or more instruction modules. The instruction modules may include computer program modules. The instruction modules may include one or more of quality model training module 608, embedding model training module 610, user control option receiving module 612, matchmaking request receiving module 614, embedding module 616, distance determining module 618, user matching module 620, and/or other instruction modules.

Quality model training module 608 may be configured to train a quality model. By way of non-limiting example, the quality model may be trained based on historical data.

Embedding model training module 610 may be configured to train an embedding model. By way of non-limiting example, the embedding model may be trained based on historical data.

User control option receiving module 612 may be configured to receive user control options from users.

Matchmaking request receiving module 614 may be configured to receive matchmaking requests from users.

Embedding module 616 may be configured to embed user data regarding the users into embedded locations.

Distance determining module 618 may be configured to determine a distance between two users. By way of non-limiting example, the distance may be a Euclidean distance.

User matching module 620 may be configured to match users based on a distance threshold.

In some implementations, computing platform(s) 602, remote platform(s) 604, and/or external resources 624 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 602, remote platform(s) 604, and/or external resources 624 may be operatively linked via some other communication media.

A given remote platform 604 may include one or more processors configured to execute computer program modules. The computer program modules may be configured to enable an expert or user associated with the given remote platform 604 to interface with system 600 and/or external resources 624, and/or provide other functionality attributed herein to remote platform(s) 604. By way of non-limiting example, a given remote platform 604 and/or a given computing platform 602 may include one or more of a server, a desktop computer, a laptop computer, a handheld computer, a tablet computing platform, a NetBook, a Smartphone, a gaming console, and/or other computing platforms.

External resources 624 may include sources of information outside of system 600, external entities participating with system 600, and/or other resources. In some implementations, some or all of the functionality attributed herein to external resources 624 may be provided by resources included in system 600.

Computing platform(s) 602 may include electronic storage 626, one or more processors 628, and/or other components. Computing platform(s) 602 may include communication lines, or ports to enable the exchange of information with a network and/or other computing platforms. Illustration of computing platform(s) 602 in FIG. 6 is not intended to be limiting. Computing platform(s) 602 may include a plurality of hardware, software, and/or firmware components operating together to provide the functionality attributed herein to computing platform(s) 602. For example, computing platform(s) 602 may be implemented by a cloud of computing platforms operating together as computing platform(s) 602.

Electronic storage 626 may comprise non-transitory storage media that electronically stores information. The electronic storage media of electronic storage 626 may include one or both of system storage that is provided integrally (i.e., substantially non-removable) with computing platform(s) 602 and/or removable storage that is removably connectable to computing platform(s) 602 via, for example, a port (e.g., a USB port, a firewire port, etc.) or a drive (e.g., a disk drive, etc.). Electronic storage 626 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 626 may include one or more virtual storage resources (e.g., cloud storage, a virtual private network, and/or other virtual storage resources). Electronic storage 626 may store software algorithms, information determined by processor(s) 628, information received from computing platform(s) 602, information received from remote platform(s) 604, and/or other information that enables computing platform(s) 602 to function as described herein.

Processor(s) 628 may be configured to provide information processing capabilities in computing platform(s) 602. As such, processor(s) 628 may include one or more of a digital processor, an analog processor, a digital circuit designed to process information, an analog circuit designed to process information, a state machine, and/or other mechanisms for electronically processing information. Although processor(s) 628 is shown in FIG. 6 as a single entity, this is for illustrative purposes only. In some implementations, processor(s) 628 may include a plurality of processing units. These processing units may be physically located within the same device, or processor(s) 628 may represent processing functionality of a plurality of devices operating in coordination. Processor(s) 628 may be configured to execute modules 608, 610, 612, 614, 616, 618, and/or 620, and/or other modules. Processor(s) 628 may be configured to execute modules 608, 610, 612, 614, 616, 618, and/or 620, and/or other modules by software, hardware, firmware, some combination of software, hardware, and/or firmware, and/or other mechanisms for configuring processing capabilities on processor(s) 628. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 608, 610, 612, 614, 616, 618, and/or 620 are illustrated in FIG. 6 as being implemented within a single processing unit, in implementations in which processor(s) 628 includes multiple processing units, one or more of modules 608, 610, 612, 614, 616, 618, and/or 620 may be implemented remotely from the other modules. The description of the functionality provided by the different modules 608, 610, 612, 614, 616, 618, and/or 620 described below is for illustrative purposes, and is not intended to be limiting, as any of modules 608, 610, 612, 614, 616, 618, and/or 620 may provide more or less functionality than is described. For example, one or more of modules 608, 610, 612, 614, 616, 618, and/or 620 may be eliminated, and some or all of its functionality may be provided by other ones of modules 608, 610, 612, 614, 616, 618, and/or 620. As another example, processor(s) 628 may be configured to execute one or more additional modules that may perform some or all of the functionality attributed below to one of modules 608, 610, 612, 614, 616, 618, and/or 620.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 7:
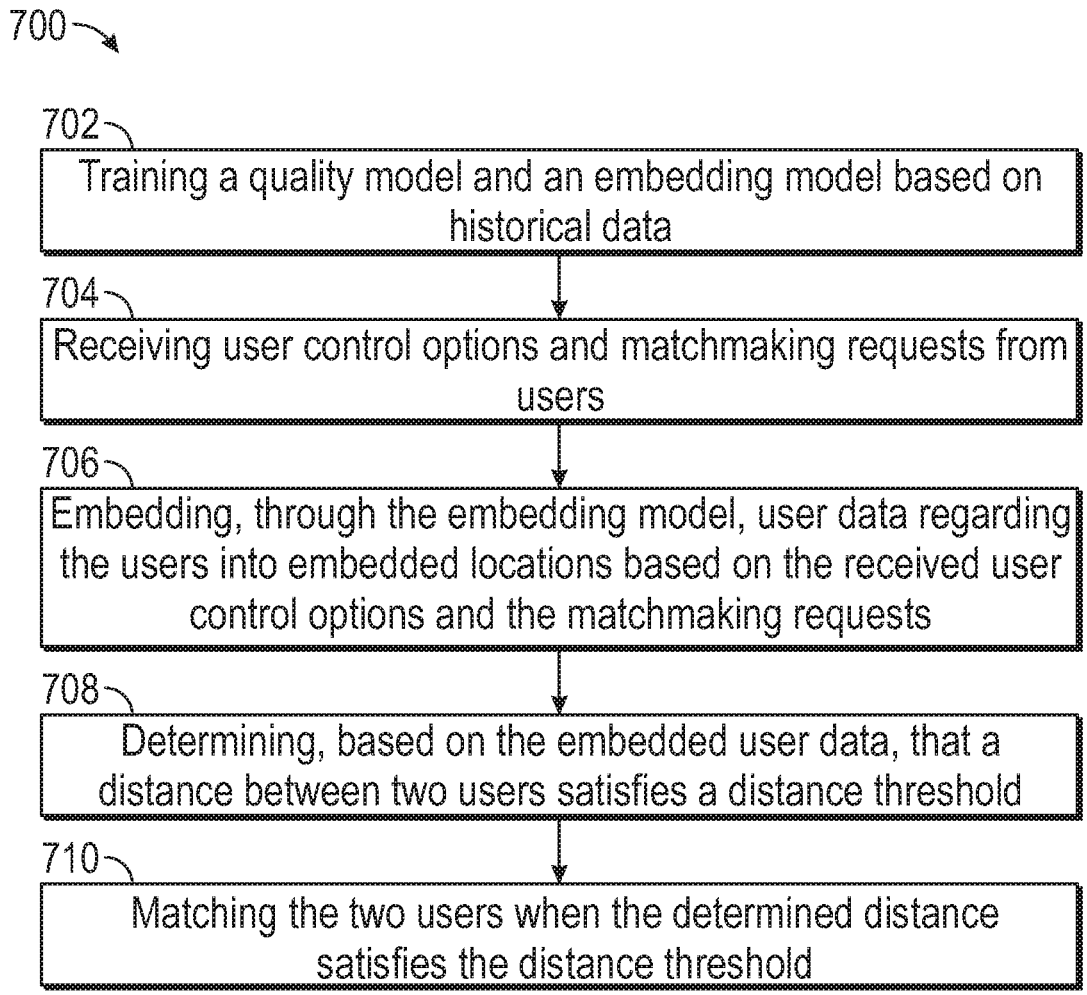
FIG. 7 illustrates an example flow diagram for user matchmaking, according to certain aspects of the disclosure.

FIG. 7 illustrates an example flow diagram (e.g., process 700) for user matchmaking, according to certain aspects of the disclosure. For explanatory purposes, the example process 700 is described herein with reference to FIGS. 1-6. Further, for explanatory purposes, the steps of the example process 700 are described herein as occurring in serial or linearly. However, multiple instances of the example process 700 may occur in parallel. For purposes of explanation of the subject technology, the process 700 will be discussed in reference to FIGS. 1-6.

At step 702, a quality model and an embedding model are trained based on historical data and user control options. At step 704 user control options and matchmaking requests are received from users. At step 706, user data regarding the users are embedded through the embedding model into embedded locations based on the received user control options and the matchmaking requests. At step 708, a distance between two users that satisfies a distance threshold is determined based on the embedded user data. At step 710, the two users are matched when the determined distance satisfies the distance threshold. According to aspects, multiple users may be matched when at least one of user preference stratification and matching quality satisfies a threshold.

For example, as described above in relation to FIGS. 1-6, at step 702, a quality model (e.g., quality model 218, 314, 406, 510) and an embedding model (e.g., embedding model 210, 310, 404, 504) are trained based on historical data (e.g., historical data 202, 302). For example, the training may be performed through the quality model training module 608 and the embedding model training module 610. At step 704 user control options (e.g., user options 206) and matchmaking requests (e.g., requests 102, 208, 502) are received from users. At step 706, user data (e.g., control options 206, requests 208, historical data 202) regarding the users are embedded through the embedding model into embedded locations (e.g., embedded location 212) based on the received user control options and the matchmaking requests. At step 708, a distance (e.g., distance 312) between two users that satisfies a distance threshold is determined based on the embedded user data (e.g., embedded locations 310). At step 710, the two users are matched (e.g., results 220) when the determined distance satisfies the distance threshold.

According to an aspect, training the quality model may further include receiving historical data, receiving a simulated match, outputting a quality estimation, and comparing the quality estimation with the simulated match.

According to an aspect, training the embedding model may further include receiving a simulated match between a first user and a second user based on historical data, embedding, through a first neural network, data of the first user into a first embedded location, embedding, through a second neural network, data of the second user into a second embedded location, calculating a distance between the first embedded location and the second embedded location, comparing a quality of the simulated match based on the calculated distance, and outputting a training signal to the first neural network and the second neural network based on the compared quality of the simulated match.

According to an aspect, the distance comprises a Euclidean distance. According to an aspect, the distance between the two users is determined based on a decision tree.

According to an aspect, the process 700 may further include outputting a matchmaking result comprising the two users.

According to an aspect, the process 700 may further include matching users when a waiting time has exceeded a waiting threshold for each of the users.

Figure 8:
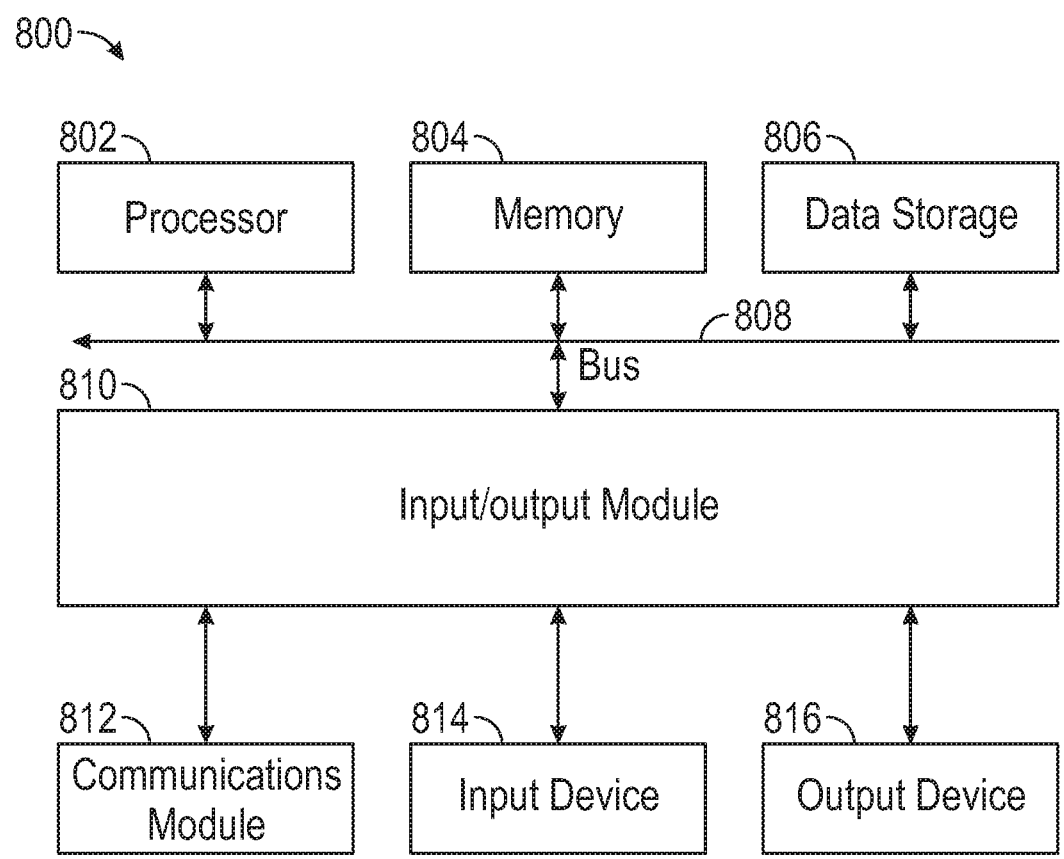
FIG. 8 is a block diagram illustrating an example computer system (e.g., representing both client and server) with which aspects of the subject technology can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

Computer system 800 (e.g., server and/or client) includes a bus 808 or other communication mechanism for communicating information, and a processor 802 coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the above-described gaming systems can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in the main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 800 reads game data and provides a game, information may be read from the game data and stored in a memory device, such as the memory 804. Additionally, data from the memory 804 servers accessed via a network the bus 808, or the data storage 806 may be read and loaded into the memory 804. Although data is described as being found in the memory 804, it will be understood that data does not have to be stored in the memory 804 and may be stored in other memory accessible to the processor 802 or distributed among several media, such as the data storage 806.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for user matchmaking, comprising:
   training a quality model and an embedding model based on historical data, wherein training the embedding model comprises:
      receiving a simulated match between a first user and a second user based on historical data,
      embedding, through a first neural network, data of the first user into a first embedded location,
      embedding, through a second neural network, data of the second user into a second embedded location,
      calculating a distance between the first embedded location and the second embedded location, and
      comparing a quality of the simulated match based on the calculated distance;
   receiving user control options and matchmaking requests from users;
   embedding, through the embedding model, user data regarding the users into an embedded space based on the received user control options and the matchmaking requests;
   determining, based on the embedded user data, that a distance between two users satisfies a distance threshold; and
   matching the two users when the determined distance satisfies the distance threshold.

2. The computer-implemented method of claim 1, wherein the distance comprises a Euclidean distance.

3. The computer-implemented method of claim 1, further comprising:
   outputting a matchmaking result comprising the two users.

4. The computer-implemented method of claim 1, wherein training the quality model comprises:
   receiving historical data;
   receiving a simulated match;
   outputting a quality estimation; and
   comparing the quality estimation with the simulated match.

5. The computer-implemented method of claim 1, wherein training the embedding model comprises:
   outputting a training signal to the first neural network and the second neural network based on the compared quality of the simulated match.

6. The computer-implemented method of claim 1, further comprising:
   matching users when a waiting time has exceeded a waiting threshold for each of the users.

7. The computer-implemented method of claim 1, wherein the distance between the two users is determined based on a decision tree.

8. A system for user matchmaking, comprising:
   a processor; and
   a memory comprising instructions stored thereon, which when executed by the processor, causes the processor to perform:
      training a quality model and an embedding model based on historical data, wherein training the embedding model comprises:
         receiving a simulated match between a first user and a second user based on historical data,
         embedding, through a first neural network, data of the first user into a first embedded location,
         embedding, through a second neural network, data of the second user into a second embedded location,
         calculating a distance between the first embedded location and the second embedded location, and
         comparing a quality of the simulated match based on the calculated distance;
      receiving user control options and matchmaking requests from users;
      embedding, through the embedding model, user data regarding the users into an embedded space based on the received user control options and the matchmaking requests;
      determining, based on the embedded user data, that a distance between two users satisfies a distance threshold; and
      matching the two users when the determined distance satisfies the distance threshold.

9. The system of claim 8, wherein the distance comprises a Euclidean distance.

10. The system of claim 8, further comprising stored sequences of instructions, which when executed by the processor, cause the processor to perform:
    outputting a matchmaking result comprising the two users.

11. The system of claim 8, further comprising stored sequences of instructions, which when executed by the processor, cause the processor to perform:

receiving historical data;
receiving a simulated match;
outputting a quality estimation; and
comparing the quality estimation with the simulated match.

12. The system of claim 8, further comprising stored sequences of instructions, which when executed by the processor, cause the processor to perform:
outputting a training signal to the first neural network and the second neural network based on the compared quality of the simulated match.

13. The system of claim 8, further comprising stored sequences of instructions, which when executed by the processor, cause the processor to perform:
matching users when a waiting time has exceeded a waiting threshold for each of the users.

14. The system of claim 8, wherein the distance between the two users is determined based on a decision tree.

15. A non-transitory computer-readable storage medium comprising instructions stored thereon, which when executed by one or more processors, cause the one or more processors to perform operations for user matchmaking, the operations comprising:
training a quality model and an embedding model based on historical data, wherein training the embedding model comprises:
receiving a simulated match between a first user and a second user based on historical data,
embedding, through a first neural network, data of the first user into a first embedded location,
embedding, through a second neural network, data of the second user into a second embedded location,
calculating a distance between the first embedded location and the second embedded location, and
comparing a quality of the simulated match based on the calculated distance;
receiving user control options and matchmaking requests from users;
embedding, through the embedding model, user data regarding the users into an embedded space based on the received user control options and the matchmaking requests;
determining, based on the embedded user data, that a distance between two users satisfies a distance threshold; and
matching the two users when the determined distance satisfies the distance threshold.

16. The computer-readable storage medium of claim 15, wherein the distance comprises a Euclidean distance.

17. The computer-readable storage medium of claim 15, comprising further instructions which, when executed by the one or more processors, cause the one or more processors to perform operations comprising:
outputting a matchmaking result comprising the two users.

18. The computer-readable storage medium of claim 15, comprising further instructions which, when executed by the one or more processors, cause the one or more processors to perform operations comprising:
receiving historical data;
receiving a simulated match;
outputting a quality estimation; and
comparing the quality estimation with the simulated match.

19. The computer-readable storage medium of claim 15, comprising further instructions which, when executed by the one or more processors, cause the one or more processors to perform operations comprising:
outputting a training signal to the first neural network and the second neural network based on the compared quality of the simulated match.

20. The computer-readable storage medium of claim 15, comprising further instructions which, when executed by the one or more processors, cause the one or more processors to perform operations comprising:
matching users when a waiting time has exceeded a waiting threshold for each of the users.

* * * * *